US012609791B2

(12) United States Patent
Hosseini et al.

(10) Patent No.: US 12,609,791 B2
(45) Date of Patent: Apr. 21, 2026

---

(54) IMPACTED TONE MITIGATION SOLUTION FOR SINGLE CARRIER WAVEFORMS

(71) Applicant: QUALCOMM Incorporated, San Diego, CA (US)

(72) Inventors: Seyedkianoush Hosseini, San Diego, CA (US); Jing Jiang, San Diego, CA (US); Vinayak Suresh, San Diego, CA (US); Jae Won Yoo, San Diego, CA (US); Yonghee Han, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 619 days.

(21) Appl. No.: 17/950,970

(22) Filed: Sep. 22, 2022

(65) Prior Publication Data

US 2024/0113817 A1    Apr. 4, 2024

(51) Int. Cl.
*H04L 5/00* (2006.01)
*H04W 72/0453* (2023.01)
*H04W 72/1263* (2023.01)

(52) U.S. Cl.
CPC .......... *H04L 5/0005* (2013.01); *H04L 5/0048* (2013.01); *H04W 72/0453* (2013.01); *H04W 72/1263* (2013.01)

(58) Field of Classification Search
CPC ... H04L 5/0005; H04L 5/0048; H04L 5/0007; H04L 5/0044; H04L 27/2602; H04L 27/2636; H04W 72/0453; H04W 72/1263
See application file for complete search history.

(56) References Cited

U.S. PATENT DOCUMENTS

| | | | | |
|---|---|---|---|---|
| 2014/0140440 A1* | 5/2014 | Sun | ...................... | H04B 1/1027 |
| | | | | 375/316 |
| 2018/0091350 A1* | 3/2018 | Akkarakaran | ........ | G01S 13/346 |
| 2020/0280412 A1* | 9/2020 | Qi | ..................... | H04W 72/0453 |
| 2020/0366396 A1* | 11/2020 | Liu | ........................... | H04L 1/08 |
| 2021/0084663 A1* | 3/2021 | Takeda | ............. | H04W 72/0446 |
| 2021/0111938 A1* | 4/2021 | Sahin | .................. | H04L 27/2626 |
| 2021/0377813 A1* | 12/2021 | Landis | ............... | H04W 72/542 |

OTHER PUBLICATIONS

5G; NR; Physical channels and modulation, 3GPP TS 38.211 version 17.2.0 Release 17 (Jul. 2022) (Year: 2022).*

* cited by examiner

*Primary Examiner* — Ayaz R Sheikh
*Assistant Examiner* — David Zhijun Sun
(74) *Attorney, Agent, or Firm* — Patterson + Sheridan, L.L.P.

(57) ABSTRACT

Certain aspects of the present disclosure provide techniques for a method for wireless communication at a wireless node comprising identifying at least one tone, obtaining a sequence of frequency domain symbols, adjusting a mapping of the frequency domain symbols to resource elements (REs) according to the at least one tone, generating a waveform based on the adjusted mapping, and outputting the waveform for transmission.

23 Claims, 15 Drawing Sheets

500

600

800

$S_5$ $S_4$ $S_3$ $S_2$ $S_1$ $M - DFT$ $X_5$                    $X_1$ $N - IDFT$

IMPACTED TONE MITIGATION SOLUTION FOR SINGLE CARRIER WAVEFORMS

BACKGROUND

Field of the Disclosure

Aspects of the present disclosure relate to wireless communications, and more particularly, to techniques for mitigating the effects of receive or transmit chain imperfections on modulated tones.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a wireless node. The method includes identifying at least one tone; obtaining a sequence of frequency domain symbols; adjusting a mapping of the frequency domain symbols to resource elements (REs) according to the at least one tone; generating a waveform based on the adjusted mapping; and outputting the waveform for transmission.

Another aspect provides a method for wireless communication at a wireless node. The method includes identifying at least one tone; adjusting a mapping of REs to frequency domain symbols according to the at least one tone; obtaining a waveform from a transmitter; and extracting a sequence of frequency domain symbols from the waveform based on the adjusted mapping.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 depicts an example time domain direct Fourier transform (DFT) spread orthogonal frequency division multiplexing (DFT-s-OFDM) waveform.

DETAILED DESCRIPTION

Aspects of the present disclosure provide apparatuses, methods, processing systems, and computer-readable mediums for mitigating the effects of receive or transmit chain imperfections on modulated tones.

A waveform generally defines the physical shape of a signal that carries modulated information through a wireless channel. At the transmitter, the information in the form of symbols is mapped from data space to the signal space and a reverse operation is performed at the receiver to recover the message. A symbol generally refers to a set of complex numbers generated by grouping a number of bits together. The number of bits grouped within one symbol determines what is referred to as a modulation order.

In current wireless systems (e.g., 5G NR), imperfections within wireless signaling may impact some frequency band positions when processing a waveform at the transmitter (Tx) or receiver (Rx) side. These impacts to some positions in the frequency band, referred to as spurs, are often due to Tx or Rx processing chain imperfections. Spurs act as a frequency-selective noise that can degrade the reception of the impacted modulated symbols. Spur components may occur within the frequency allocation of a single user equipment (UE), impacting the UE's own transmission and reception, or may occur outside the allocation, potentially impacting other UEs.

Spurs typically appear as a narrow-band signal impacting a few number of REs, meaning the impact may be constrained to a set of modulated symbols only for some waveforms where the modulated symbols are in frequency-domain, such as certain OFDM. However, for other waveforms, such as single-carrier waveforms, where the modulated symbols are generated in the time-domain, such as certain single carrier waveforms, impacting even one RE could degrade the EVM for a large number of modulated symbols. OFDM waveforms are often used due to their ability to cope with frequency selectivity, but at the cost of increased power average to peak ratio (PAPR) that can lead to less that optimal power amplifier performance at the transmitter. Single carrier waveforms, on the other hand, may result in lower PAPR.

Aspect of the present disclosure provide techniques for mitigating the impact of spurs caused by imperfections at a transmitter or receiver, for example, on single-carrier waveforms. To this end, the techniques described herein may ensure error vector magnitude performance (EVM) performance, while keeping PAPR low, which may enhance wireless signalling by increasing achievable throughput.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
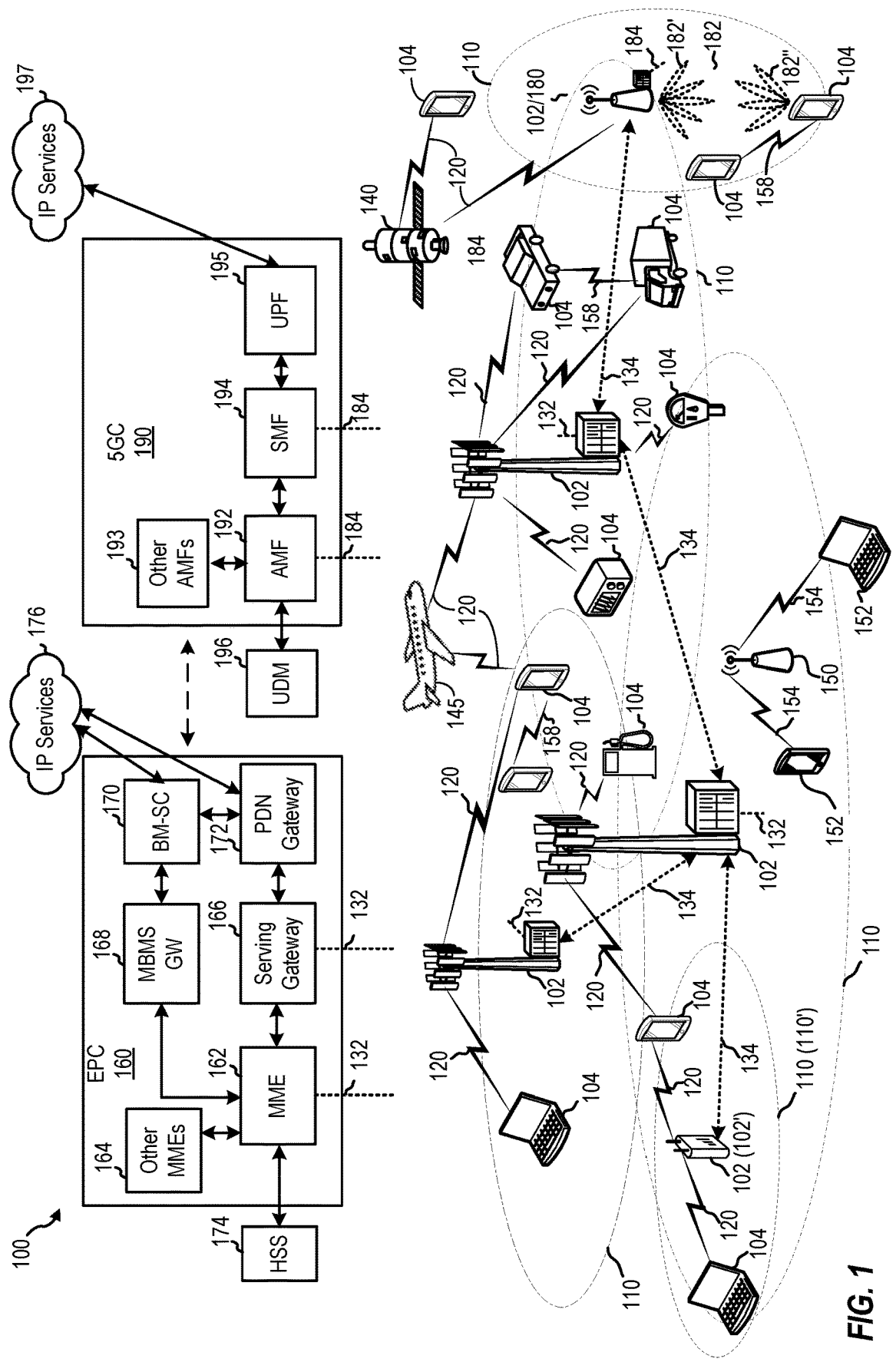
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
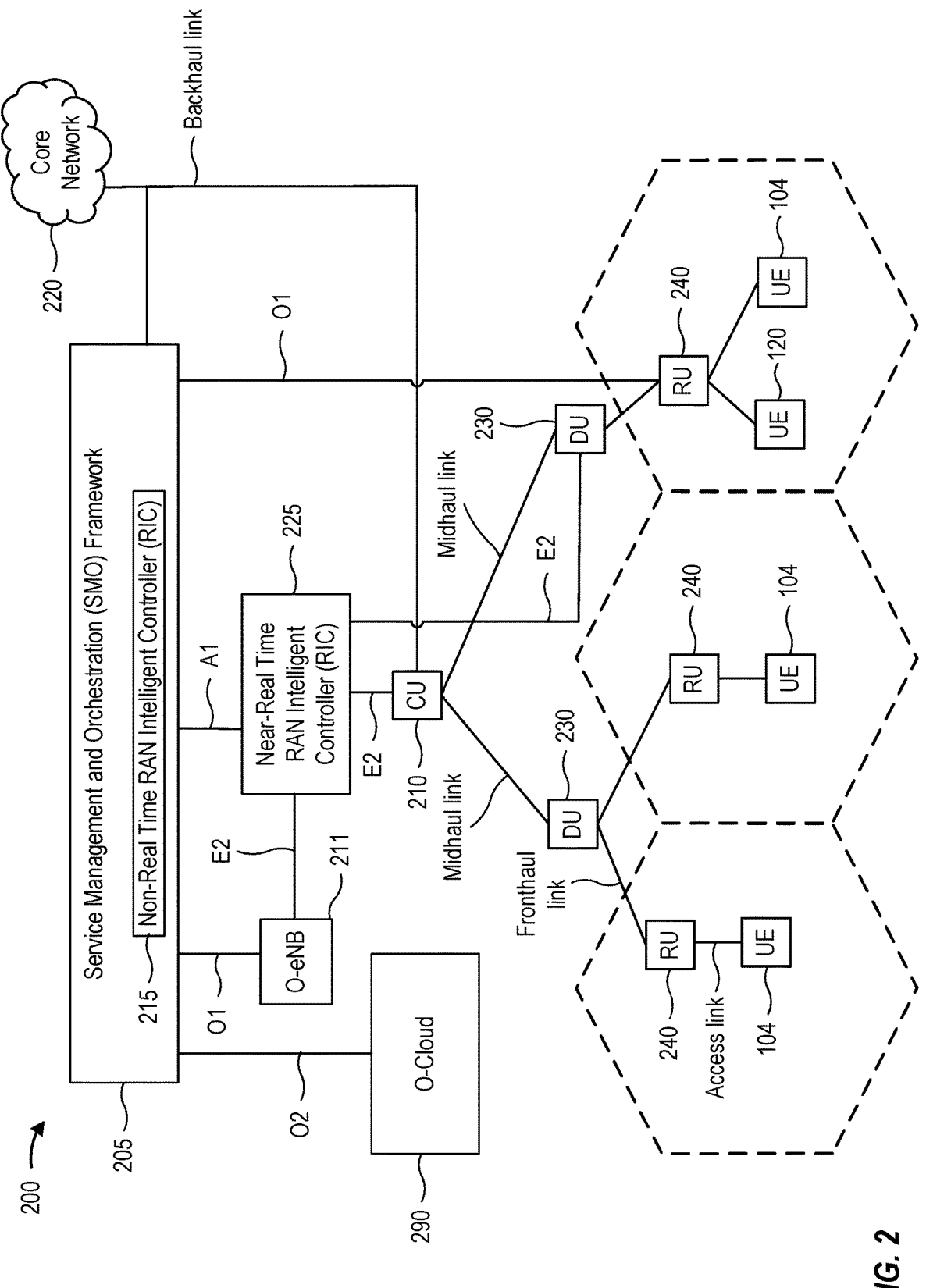
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs)

152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
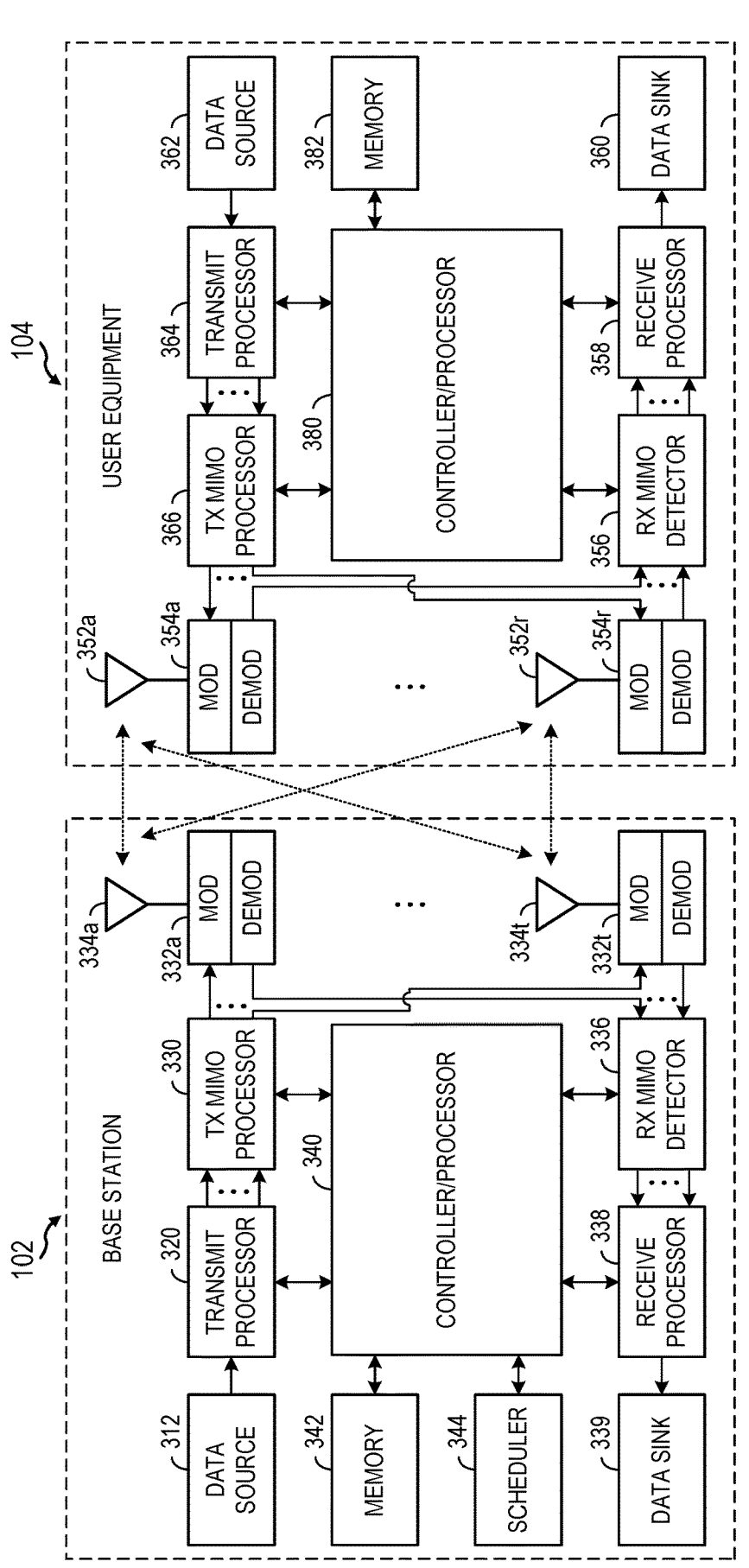
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source

362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
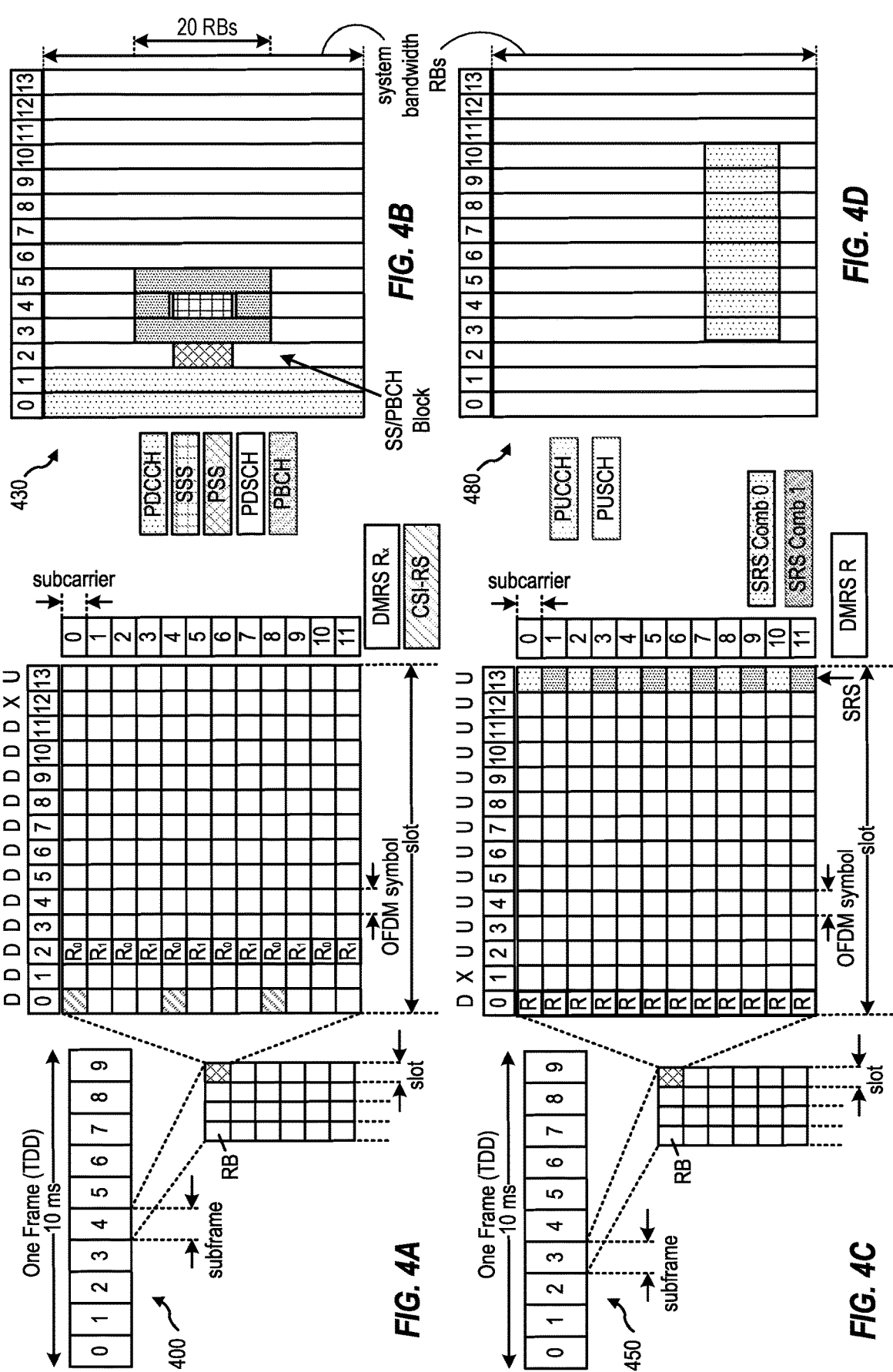
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Mitigating Impacted Tones

As noted above, imperfections within wireless signaling may impact some frequency band positions when processing a waveform at the transmitter (Tx) or receiver (Rx). These impacts to some positions in the frequency band, referred to as spurs, are often due to Rx or Tx chain imperfections. Spurs act as a frequency-selective noise that can degrade the reception of the impacted modulated symbols.

Spur can be modelled as follows in the time and frequency domains, respectively, for a spur at $f_0$ Hertz (Hz) and carrier frequency of $f_c$ Hz:

$$s_I(n) = \exp\left(i * \frac{2\pi n k_0}{N}\right), n = 0, \ldots, N-1$$

$$k_0 = (f_0 - f_c)/SCS$$

As a spur may be thus modelled as a ramp in the time domain, it may be represented by a spike in the frequency domain on tone $k_0$. Multiple of such spurs (at different frequency locations) may be observed due to imperfections at a UE's Tx/Rx processing chains.

For a given UE, the spur locations do not typically vary. Often, these locations are known to the UE itself. The magnitude and phase of a spur can be estimated in different ways and be used to compensate for its impact. However, such estimations may require long durations of time over which the phase and/or magnitude continuity of the spur can be kept. Further, estimations may be difficult in certain scenarios, for example, where there is a downlink/uplink (D/U) slot switch that does not allow for phase and/or magnitude continuity. As a result, the impact of the spur may not be fully compensated in current spur mitigation schemes. The residual spur could may degrade the estimation of the modulated symbols/decoding of the transport block (TB), thereby reducing achievable throughput.

As noted above, spurs typically appear as a narrow-band signal impacting a few number of REs. Hence, spur impact may be constrained to a set of modulated symbols for some waveforms where the modulated symbols are in frequency-domain. This may be the case, for example, for cyclic prefix OFDM (CP-OFDM), filtered OFDM (f-OFDM), universal filtered multi-carrier (UFMC), and the like. For this set of waveforms, the performance impact caused by spurs may be mitigated by nulling impacted tones, meaning the corresponding REs may not be used for transmission by the transmitter entity.

However, for other waveforms where the modulated symbols are generated in the time-domain, impacting even one RE may degrade the error vector magnitude (EVM) for a large number of modulated symbols. This may be the case for single-carrier waveforms, such as direct Fourier transform spread OFDM (DFT-s-OFDM), zero tail DFT-s-OFDM, single-carrier quadrature amplitude modulation (SC-QAM), and the like. For this set of waveforms, RE nulling may lead to poor EVM performance.

Aspect of the present disclosure provide techniques for mitigating the impact of imperfections, such as Tx or Rx-side spurs for single-carrier waveforms. The techniques described herein may ensure EVM performance, while keeping the peak-to-average-power ratio (PAPR) as low as possible.

Figure 5:
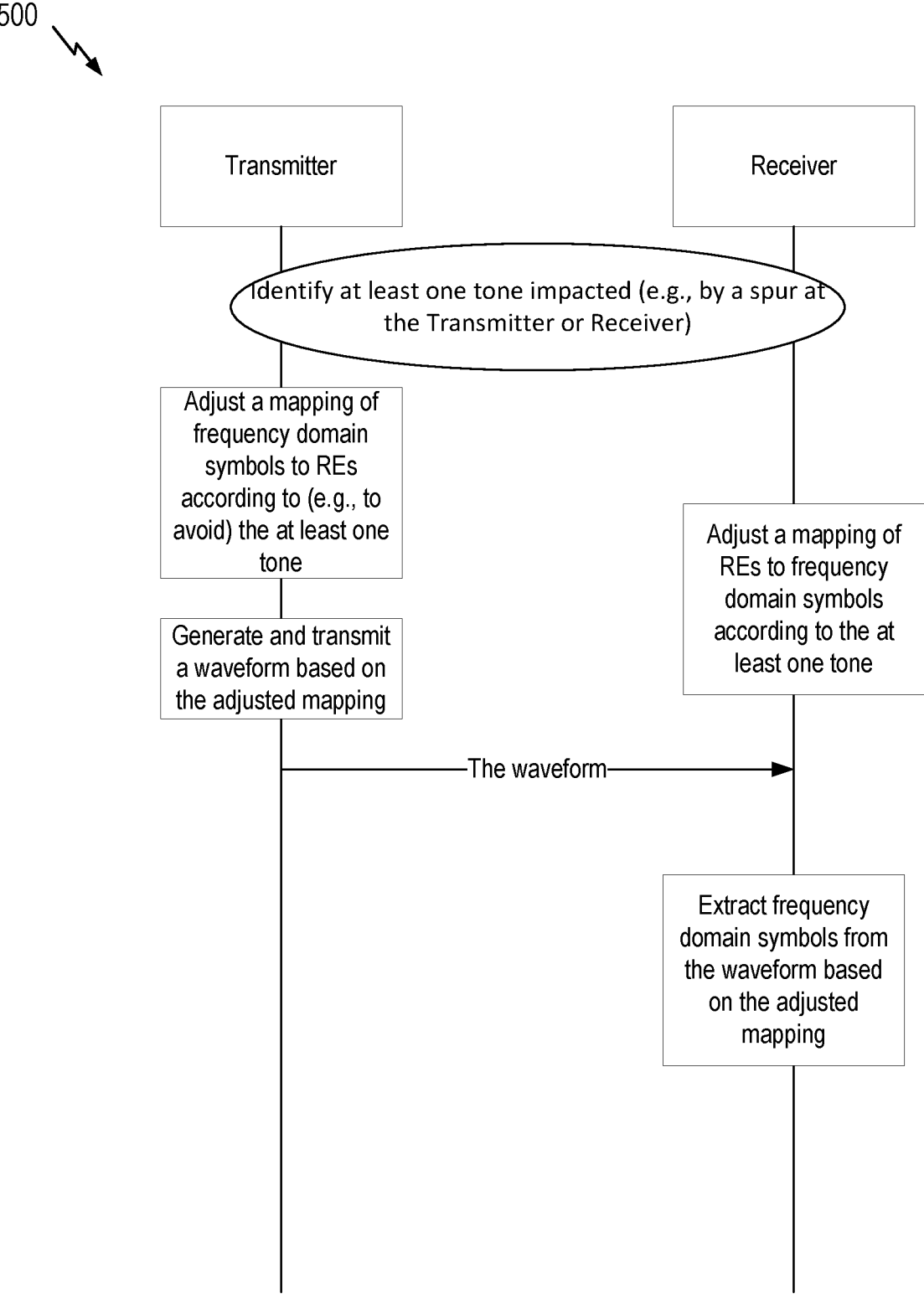
FIG. 5 is an example call flow diagram illustrating mitigation of impacted tones, according to aspects of the present disclosure.

Techniques proposed herein for mitigating the impact of spurs on a transmitted waveform may be understood with reference to the call flow diagram 500 shown in FIG. 5. The example depicts an example transmitter and receiver. In some aspects, the receiver may be an example of the BS 102 depicted and described with respect to FIGS. 1 and 3 or a disaggregated base station depicted and described with respect to FIG. 2. Similarly, the transmitter may be an example of UE 104 depicted and described with respect to FIGS. 1 and 3. However, in other aspects, the transmitter and/or receiver may be another type of wireless communications device.

As illustrated, the transmitter and receiver may first identify at least one impacted tone (e.g., impacted by a spur at the transmitter or receiver). While the spurs may be caused by imperfections at either the transmitter or receiver, both sides may need to identify which tone(s) are impacted, so they may process accordingly. In other words, a transmitter may perform the techniques described herein to mitigate the impact of a spur caused by imperfections at the receiver, if it is aware of that tone. Similarly, the receiver needs to know what mitigation processing was performed at the transmitter, so it can perform corresponding (complementary) processing of the received waveform.

As illustrated, the transmitter may adjust a mapping of frequency domain symbols to resource elements (REs) according to the identified at least one tone. The transmitter may then generate and transmit a waveform based on the adjusted mapping. Complementary processing may be performed on the receive side. For example, the receiver may adjust a mapping (or de-mapping) of REs to frequency domain symbols, according to the at least one tone. The receiver may then extract frequency domain symbols from the waveform, based on the adjusted mapping. In some cases, the transmitter (e.g., a UE) may signal the receiver (e.g., a base station) an indication of one or more impacted tones.

According to certain aspects of the present disclosure, the frequency tones potentially impacted by a spur may be not used for data transmission. According to a first approach, the modulated symbols (starting with a symbol that would have been mapped to the impacted tone) may be shifted, in order, to the next available tone.

Figure 6:
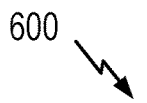
FIG. 6 depicts an example mapping for mitigation of impacted tones, according to aspects of the present disclosure.
Figure 6:
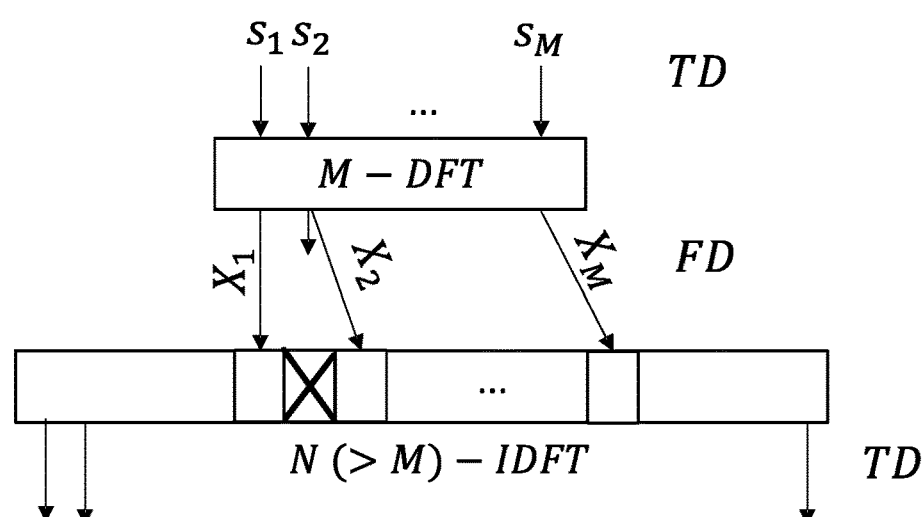

An example of effectively nulling an impacted tone in this manner is illustrated in FIG. 6. In the illustrated example, M symbols are mapped to N tones (where N>M) and tone #2 is impacted. As such, after an M-point DFT, symbol X2 that would have been mapped to tone #2, is shifted to avoid tone #2. In general, all $X_i$ after the null tone are mapped to a set of REs shifted by one to the right. In this example, one additional RE is used. In this case, EVM may remain perfect as all (the same number M) tones are transmitted.

Figure 7:
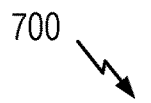
FIG. 7 depicts another example mapping for mitigation of impacted tones, according to aspects of the present disclosure.
Figure 7:
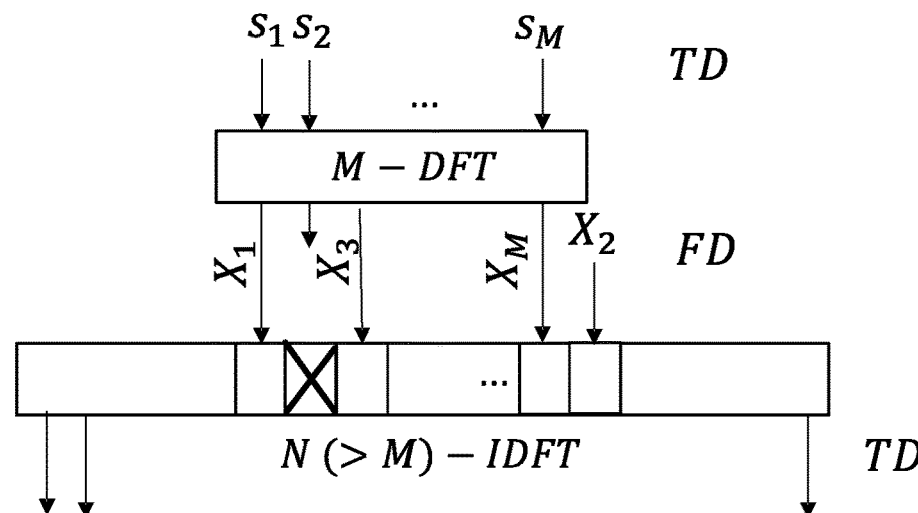

According to a second approach, illustrated in FIG. 7, the order of mapping frequency-domain symbols to REs remains may remain unchanged. Instead, the frequency-domain symbols whose original RE is nulled may be appended to an end of the allocation. The example illustrated in FIG. 7 again assumes tone #2 is nulled. All frequency-domain symbols after $X_2$ are mapped to their associated RE without any shift. Then, $X_2$ is appended to an extra RE. Similar to the case where modulated symbols are shifted to the next available tone, one additional RE is used, and EVM is remains perfect as all tones are transmitted.

While the example in FIG. 7 shows X2 appended after a last tone (after tone M), in some cases X2 could be appended to the other end (e.g., before tone 1). Further, in one implementation of the second solution, a wireless node may map $X_2$ to the impacted tone and also repeat $X_2$ by appending them to the end. This solution may be useful as applied to a DFT-s-OFDM waveform.

Figure 8:
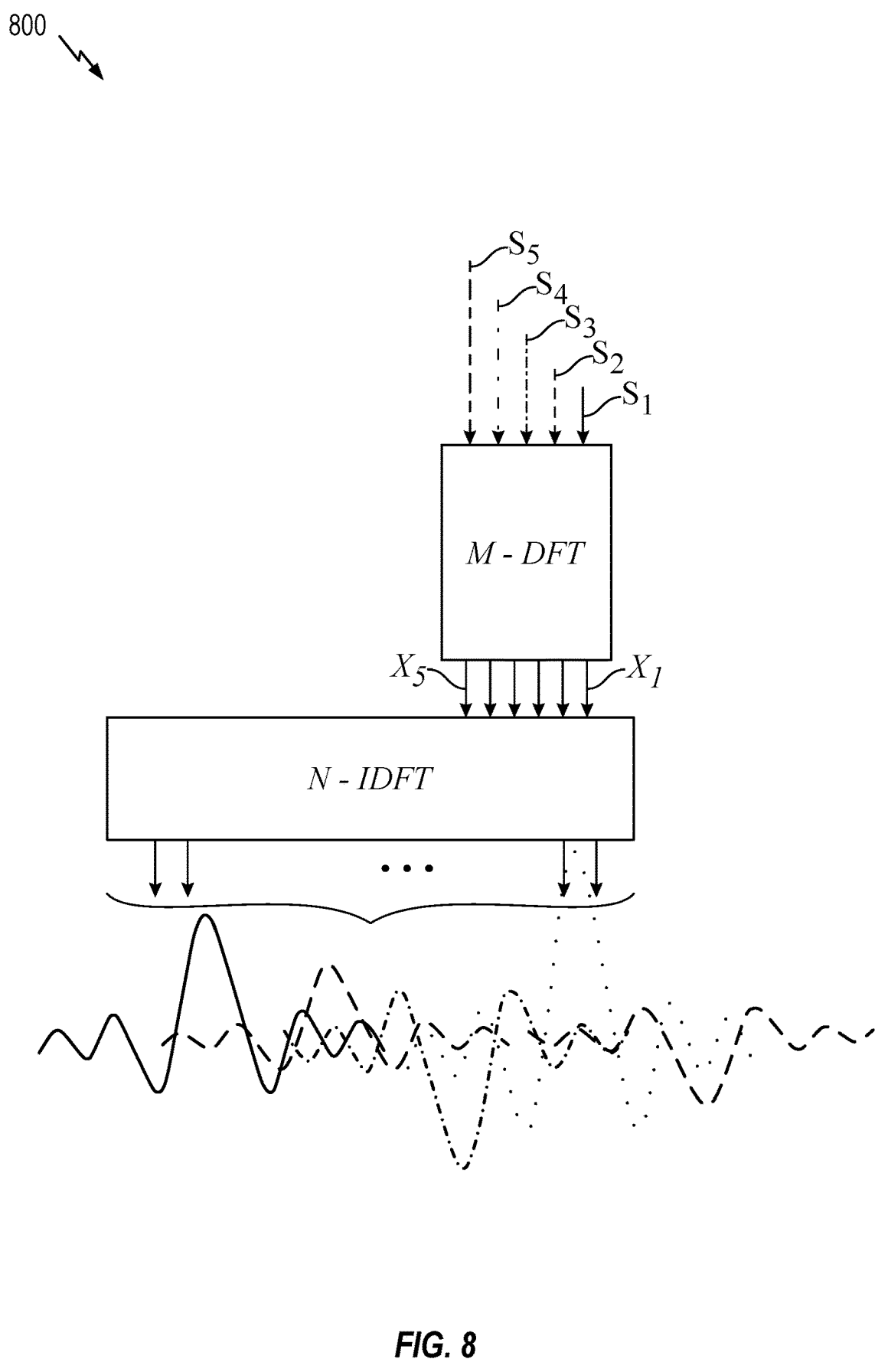

FIG. 8 illustrates an example time-domain DFT-s-OFDM waveform and how the shifting described herein may impact the generated waveform. As illustrated, the generated waveform is a summation of Sinc functions with a main peak at different locations. Each Sinc function is scaled by the modulated symbol that triggered it. PAPR is a function of how these Sinc functions are summed in the time-domain.

The single-carrier waveforms (e.g., DFT-s-OFDM) are often useful due to their low PAPR. For example, assuming M=5, it follows that:

$$X_1 = s_1 + s_2 + .. + s_5$$
$$X_2 = s_1 + e^{j\theta}s_2 + ... + e^{j4\theta}s_5$$
$$...$$
$$X_5 = s_1 + e^{j4\theta}s_2 + ... + e^{j16\theta}s_5$$

The two approaches above may have different impacts on PAPR. For example, in the solution shown in FIG. 6, one of the X's may be removed, and a new one generated on the next RE. Accordingly, all other REs are also shifted and may not remain similar to those from the unimpacted DFT-s-OFDM waveform.

Under the solution shown in FIG. 7, while one of the X's is also removed, the other REs stay the same and a new X is added to the end. Accordingly, the resulting time domain (TD) waveforms may remain largely similar to the unimpacted DFT-s-OFDM waveform. As a result, the waveform generated under the solution may be expected to retain the PAPR gains of the unimpacted DFT-s-OFDM waveform, to a large extent.

The actual gains in PAPR (reduction) realized under various approaches proposed herein may vary depending on the allocation size and number of impacted tones (spurs). In general, the gain in PAPR of the second solution (illustrated in FIG. 7) over the first solution (illustrated in FIG. 6) may be dependent on the allocation size (number of RBs).

Figure 9A:
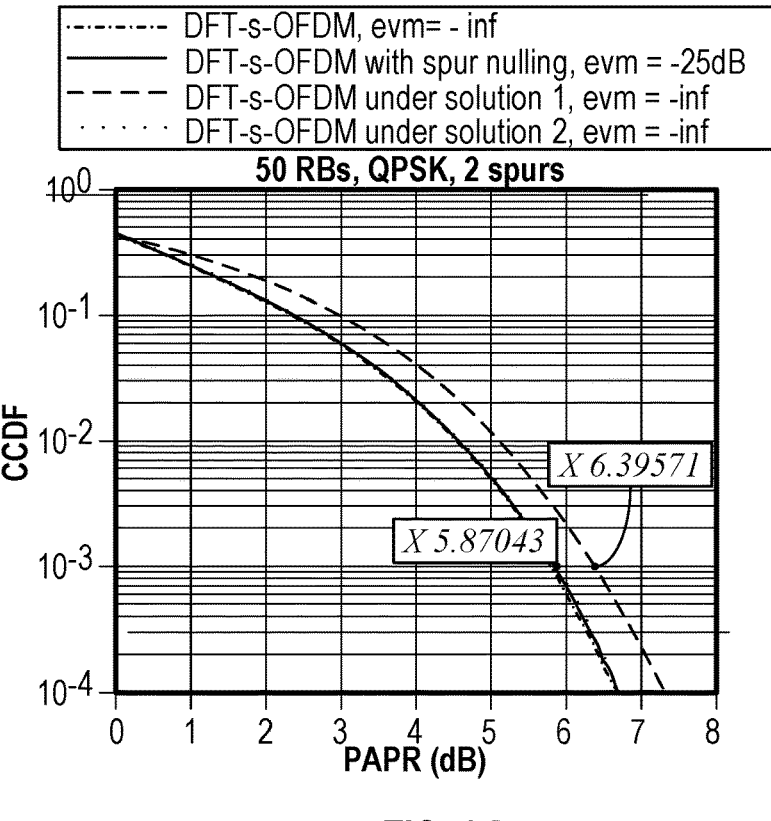
FIGS. 9A and 9B depict example gains for a quadrature phase shift keying (QPSK) waveform achievable by mitigation of impacted tones, according to aspects of the present disclosure.
Figure 9B:
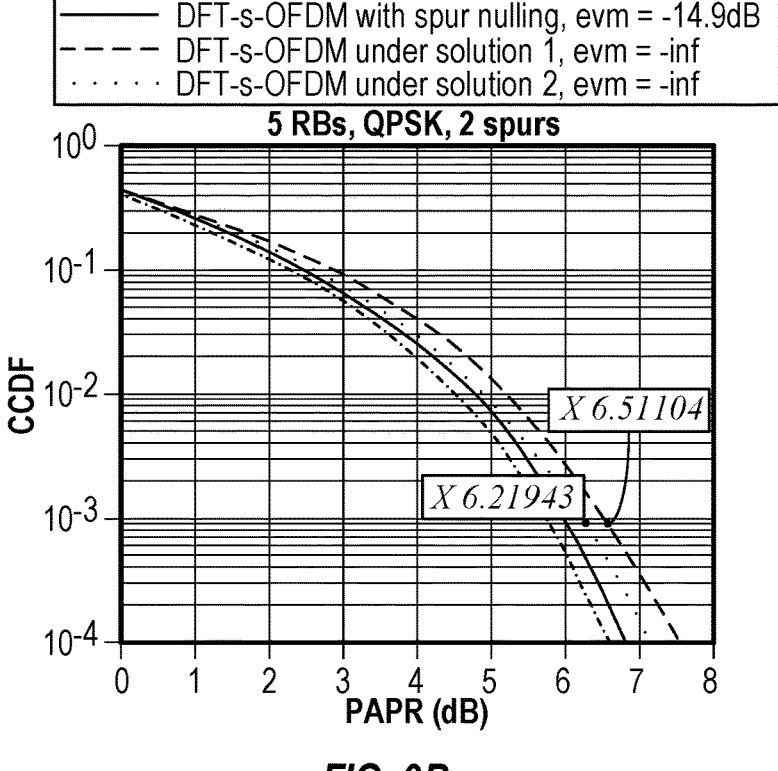

For example, FIG. 9A illustrates example PAPR for the first and second solutions (illustrated in FIGS. 6 and 7, respectively) for an allocation of 50 resource blocks (RBs) having two spurs for a quadrature phase shift keying (QPSK) waveform. In this case, for a cumulative distribution function (CCDF) of $10^{-3}$, the first solution, has a PAPR approximately 0.5 dB higher than the second solution. When the allocation is reduced from 50 to 5 RBs, as illustrated in FIG. 9B, the gain realized by the second solution is reduced (from approximately 0.5 dB) to approximately 0.3 dB.

Figure 10A:
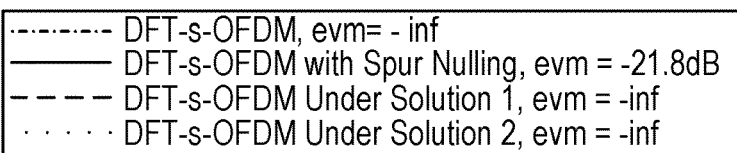
FIGS. 10A and 10B depict example gains for a quadrature phase shift keying (QPSK) waveform achievable by mitigation of impacted tones, according to aspects of the present disclosure.
Figure 10A:
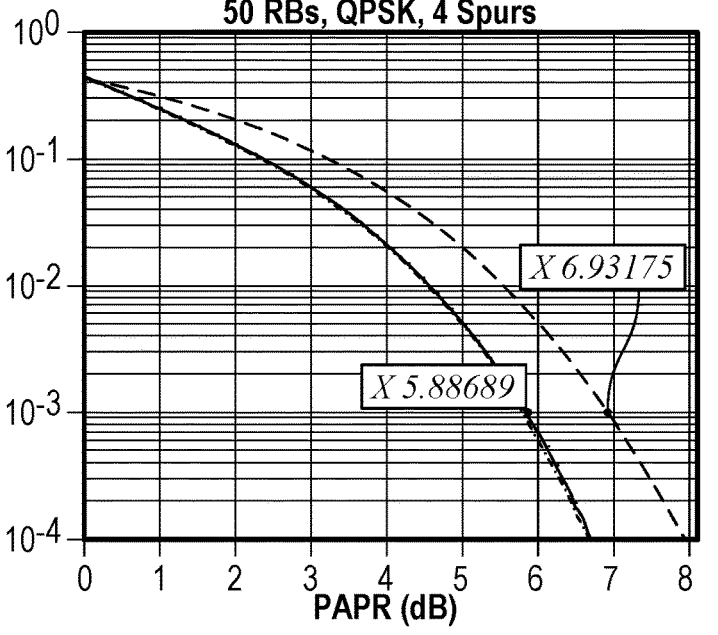

The gain of the second solution may also be dependent on the number of spurs. For example, FIG. 10A illustrates an example allocation of 50 RBs, similar to FIG. 9A, but with four spurs (instead of two). In this case, the gain realized by the second solution is increased (from approximately 0.5 dB) to approximately 1 dB.

Figure 10B:
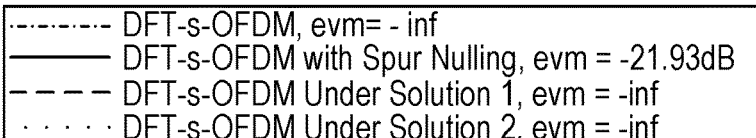
Figure 10B:
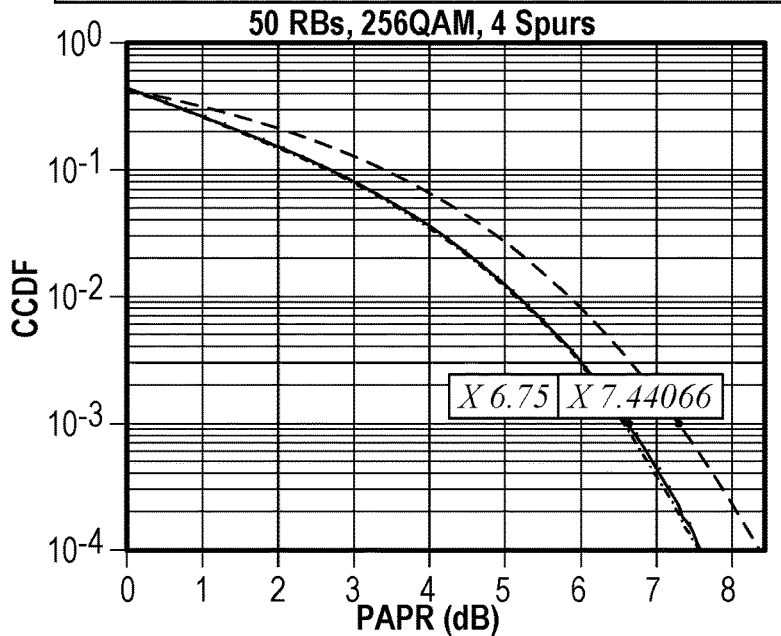

The relative gains of the first and second solutions may also be dependent on the modulation order. For example, FIG. 10B illustrates an example allocation of 50 RBs and four spurs, similar to FIGS. 10B, but with 256 QAM modulation. In this case, the gain realized by the second solution is reduced (from approximately 1 dB) to approximately 0.7 dB.

In certain cases, the solutions described above may be useful as applied to other single-carrier waveforms. For example, the first and second solutions may be applied to ZT-DFT-s-OFDM and single-carrier QAM (SC-QAM) and, in general, any similar waveform generated as a DFT pre-coded OFDM with modulated symbols in time-domain.

Figure 11A:
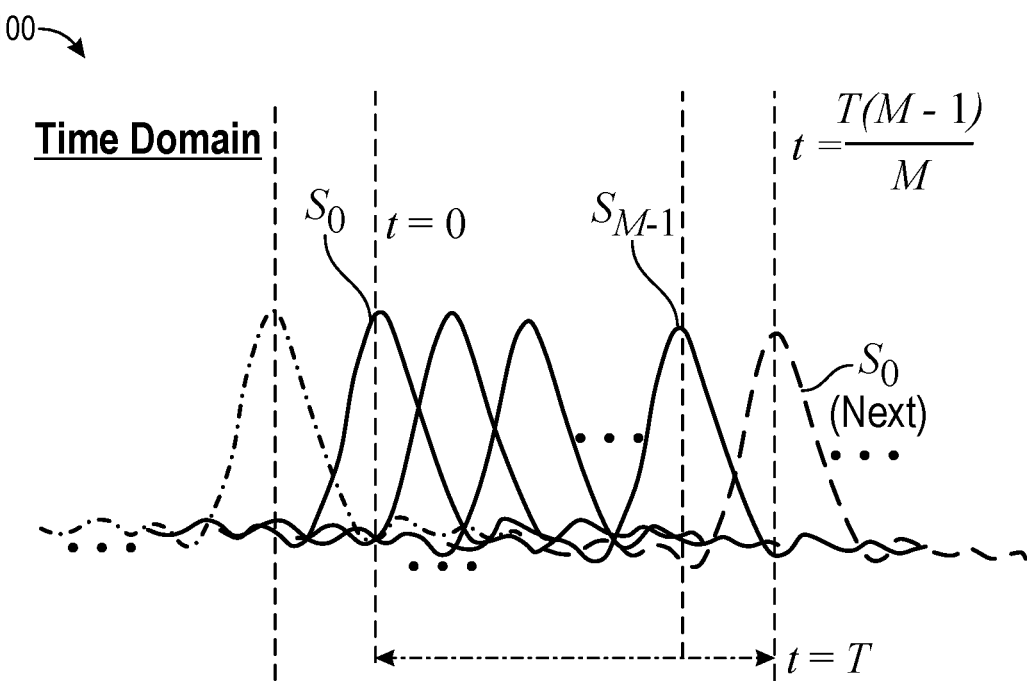
FIGS. 11A and 11B depict an example single carrier QAM (SC-QAM) waveform and filter that may be applied to the same, according to aspects of the present disclosure.
Figure 11B:
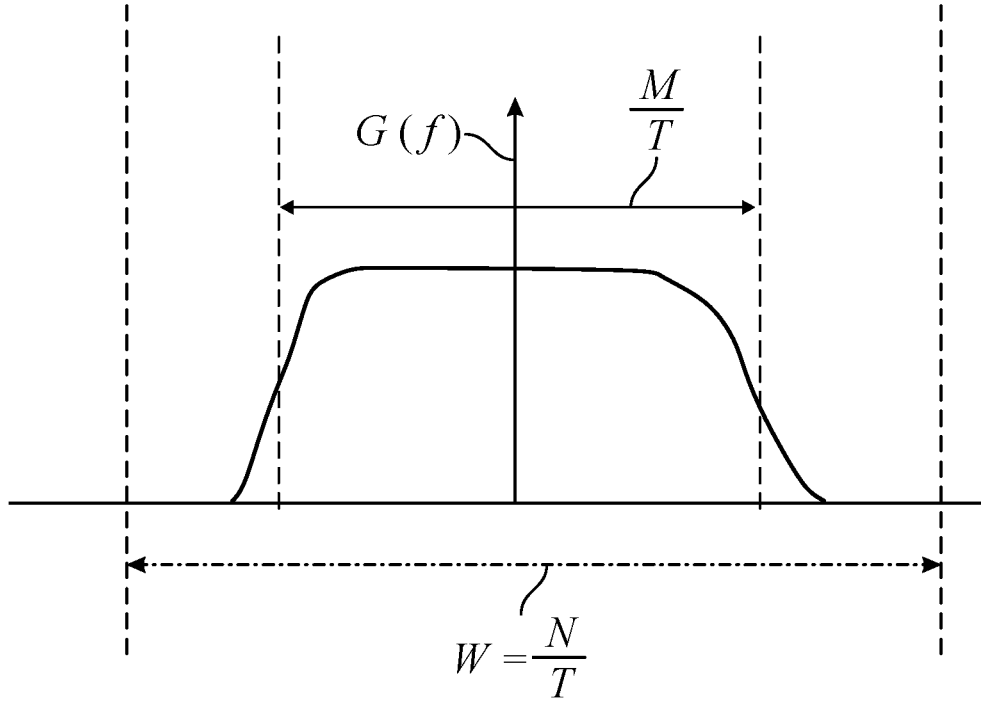

An SC-QAM waveform is illustrated in FIG. 11A. The waveform transmits M QAM symbols over duration of T To reduce spectral leakage, each QAM symbol is filtered, for example, using a squared-root raised cosine filter, as illustrated in FIG. 11B. Here, it is assumed that the total bandwidth (BW) is N/T. The transmitted waveform is then:

$$s(t) = \sum_{k=0}^{M-1} s_k g'\left(t - k\left(\frac{T}{M}\right)\right), g'(t) = 0, t = \pm \frac{kT}{M}, k \neq 0.$$

Figure 12:
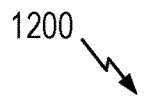
FIG. 12 depicts an example mapping for mitigation of impacted tones for a DFT pre-coded OFDM waveform, according to aspects of the present disclosure.
Figure 12:
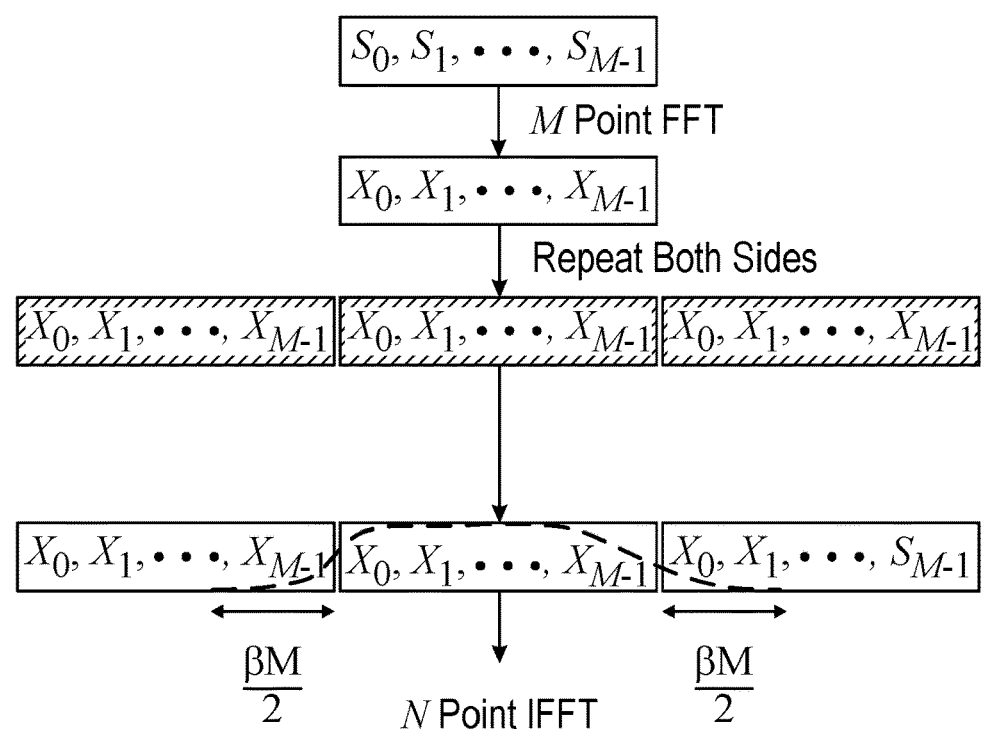

In certain cases, this waveform may be represented as a DFT pre-coded OFDM as illustrated in FIG. 12. As illustrated, this case may involve a repetition step, where frequency domain symbols are repeated on both sides of the original symbols. To apply either of the first or second solution to this waveform, certain changes may be applied prior to the repetition step. Once applied, the rest of the processing described above may remain unchanged. In some cases, as illustrated in FIG. 12, due to using additional REs under the first and second solutions, the bandwidth of the filter may be increased accordingly.

In some cases, if tone-reservation is implemented, nulled tones may potentially be also be used to generate the peak-cancellation waveform.

The solutions proposed herein may be applied to both downlink and uplink transmissions. Although the use of single-carrier waveforms may be more common in uplink communication due to PAPR benefits, such waveforms are candidates for DL communication in higher bands in order to save energy.

As described above with reference to FIGS. 9A-9B and FIGS. 10A-10B, the applicability of the first and second solutions may be dependent on the QAM order, number of spurs, the waveform (e.g., DFT-s-OFDM vs. SC-QAM) and the size of allocation. Whether either of the first or second solutions is used by the transmitter may be dynamically or semi-statically indicated to the receiver (e.g., via radio resource control (RRC) signaling). As an example, a gNB may indicate to a UE to apply a particular solution for allocations larger than a certain number of RBs. This may be signaled to a UE via RRC. Alternatively, a grant (e.g., DCI) could convey this information dynamically. In certain cases, the rules for uplink and downlink communications may be defined and indicated separately.

In some cases, the support for the solutions described herein may be based on UE capability and may be declared separately for downlink and uplink communication.

In some cases, for the second solution, the order of appending the REs and their location may be in ascending or descending order of the nulled REs, or any other order that is indicated to the receiver or agreed between the transmitter and receiver.

In some cases, since only a few spurs are typically expected, the extension of BW may not cover one full RB. The rest of RB may remain unused, or used by the same transmitter, for example, to repeat some of the other REs. Alternatively, if a new resource allocation scheme that assigns the resources in groups of RBs, but with RE-level starting point is introduced, these unused REs may be used more efficiently.

In some cases, the solutions described herein may also be used in the context of carrier aggregation, with a gap across allocations for the UE on the carriers. For example, where a UE has a first physical uplink control channel (PUSCH) on a first component carrier (CC) and a second PUSCH on a second CC, and the gap between both the CCs and the PUSCH allocations is not large, then, the solutions may be applied to how the UE performs symbol mapping. The solutions describe herein may also be used in the context of resource allocations with gaps (i.e., non-contiguous resource allocation), where the resources may be allocated on the same carrier.

In some cases, the solutions described herein may be used in a case where there is a hole in the allocation of a PUSCH for reasons other than spur. For example, holes in in the allocation of a PUSCH may occur where the UE has to rate-match its transmission around other channels.

Example Operations of a Wireless Node

Figure 13:
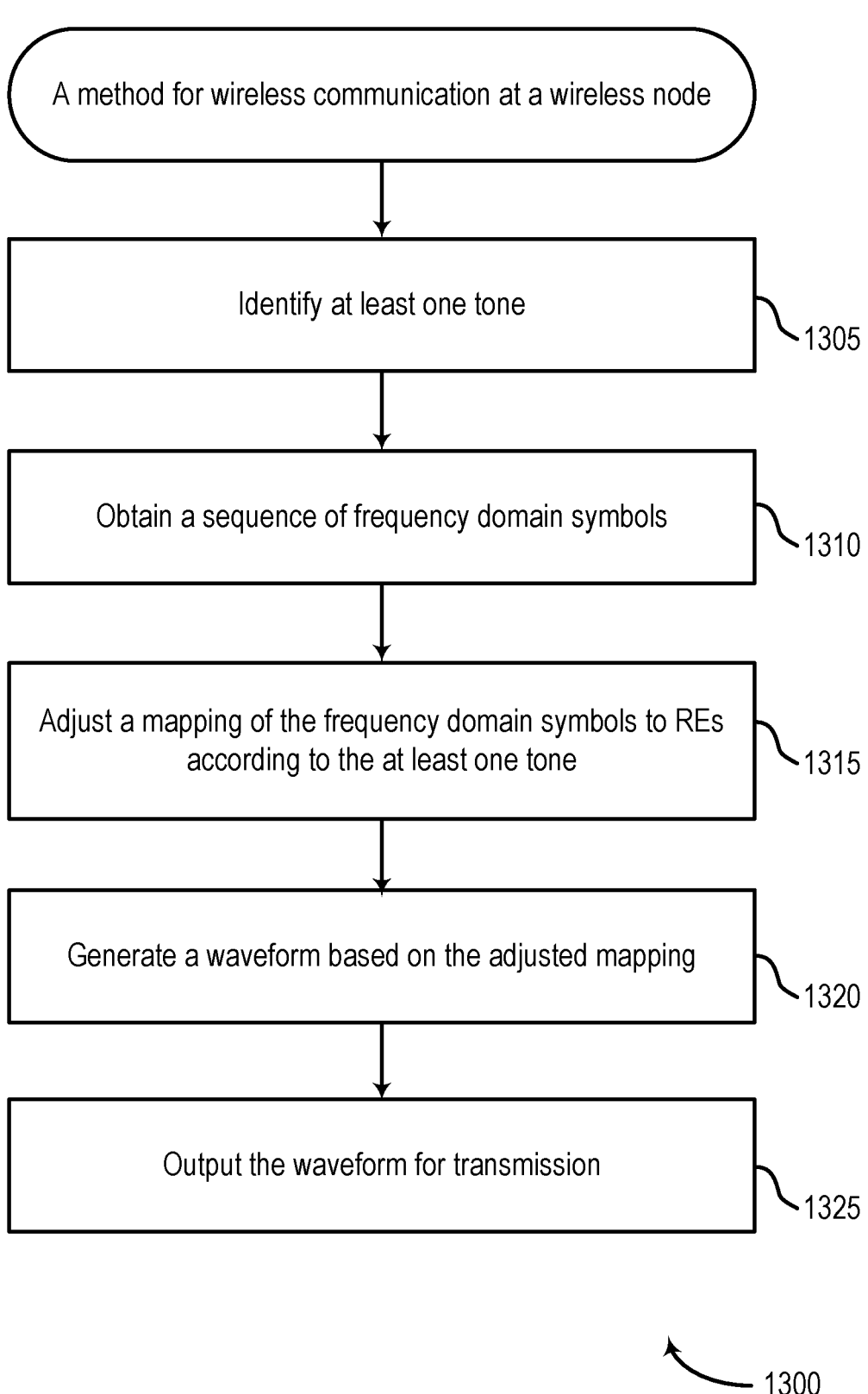
FIG. 13 depicts a method for wireless communications.

FIG. 13 shows an example of a method 1300 for wireless communication at a wireless node. In some examples, the wireless node is a UE, such as a UE 104 of FIGS. 1 and 3. In some examples, the wireless node is a network entity, such as BS 102 of FIGS. 1 and 3, or a disaggregated base station as discussed with respect to FIG. 2.

Method 1300 begins at step 1305 with identifying at least one tone. In some cases, the operations of this step refer to, or may be performed by, circuitry for identifying and/or code for identifying as described with reference to FIG. 15.

Method 1300 then proceeds to step 1310 with obtaining a sequence of frequency domain symbols. In some cases, the operations of this step refer to, or may be performed by, circuitry for obtaining and/or code for obtaining as described with reference to FIG. 15.

Method 1300 then proceeds to step 1315 with adjusting a mapping of the frequency domain symbols to REs according to the at least one tone. In some cases, the operations of this step refer to, or may be performed by, circuitry for adjusting and/or code for adjusting as described with reference to FIG. 15.

Method 1300 then proceeds to step 1320 with generating a waveform based on the adjusted mapping. In some cases, the operations of this step refer to, or may be performed by, circuitry for generating and/or code for generating as described with reference to FIG. 15.

Method 1300 then proceeds to step 1325 with outputting the waveform for transmission. In some cases, the operations of this step refer to, or may be performed by, circuitry for outputting and/or code for outputting as described with reference to FIG. 15.

In some aspects, the adjustment comprises changing an order of the mapping to avoid the identified at least one tone.

In some aspects, changing the order of the mapping comprises shifting at least some of the frequency domain symbols, in order, starting with a first frequency domain symbol that would have mapped to the at least one tone before adjusting the mapping.

In some aspects, the at least one tone comprises at least a first tone and a second tone; and the frequency domain symbols are: shifted, in order, starting with a first frequency domain symbol that would have mapped to the first tone, and shifted again, in order, starting with a second frequency domain symbol that would have mapped to the second tone.

In some aspects, the REs are part of an allocated set of REs; and the adjustment comprises appending a first frequency domain symbol of the frequency domain symbols that would have mapped to the at least one tone to at least one end of the allocation.

In some aspects, the first frequency domain symbol is also mapped to the at least one tone.

In some aspects, the method 1300 further includes maintaining an order of mapping for one or more frequency domain symbols after the first frequency domain symbol when adjusting the mapping. In some cases, the operations of this step refer to, or may be performed by, circuitry for maintaining and/or code for maintaining as described with reference to FIG. 15.

In some aspects, the at least one tone comprises at least a first tone and a second tone; and the adjustment comprises appending the first frequency domain symbol that would have mapped to the first tone and a second frequency domain symbol of the frequency domain symbols that would have mapped to the second tone to an end of the allocation.

In some aspects, the method 1300 further includes obtaining signaling indicating a location of one of the REs for appending the first frequency domain symbol. In some cases, the operations of this step refer to, or may be performed by, circuitry for obtaining and/or code for obtaining as described with reference to FIG. 15.

In some aspects, generating the waveform comprises generating repetitions of the frequency domain symbols; and the mapping of the frequency domain symbols to the REs is adjusted before generating the repetitions.

In some aspects, the method 1300 further includes using the identified at least one tone as part of a tone reservation scheme. In some cases, the operations of this step refer to, or may be performed by, circuitry for using and/or code for using as described with reference to FIG. 15.

In some aspects, the method 1300 further includes obtaining signaling indicating when to adjust the mapping to avoid the at least one tone. In some cases, the operations of this step refer to, or may be performed by, circuitry for obtaining and/or code for obtaining as described with reference to FIG. 15.

In some aspects, the method 1300 further includes outputting, for transmission, signaling indicating a capability of the wireless node to adjust the mapping to avoid the at least one tone. In some cases, the operations of this step refer to, or may be performed by, circuitry for outputting and/or code for outputting as described with reference to FIG. 15.

Figure 15:
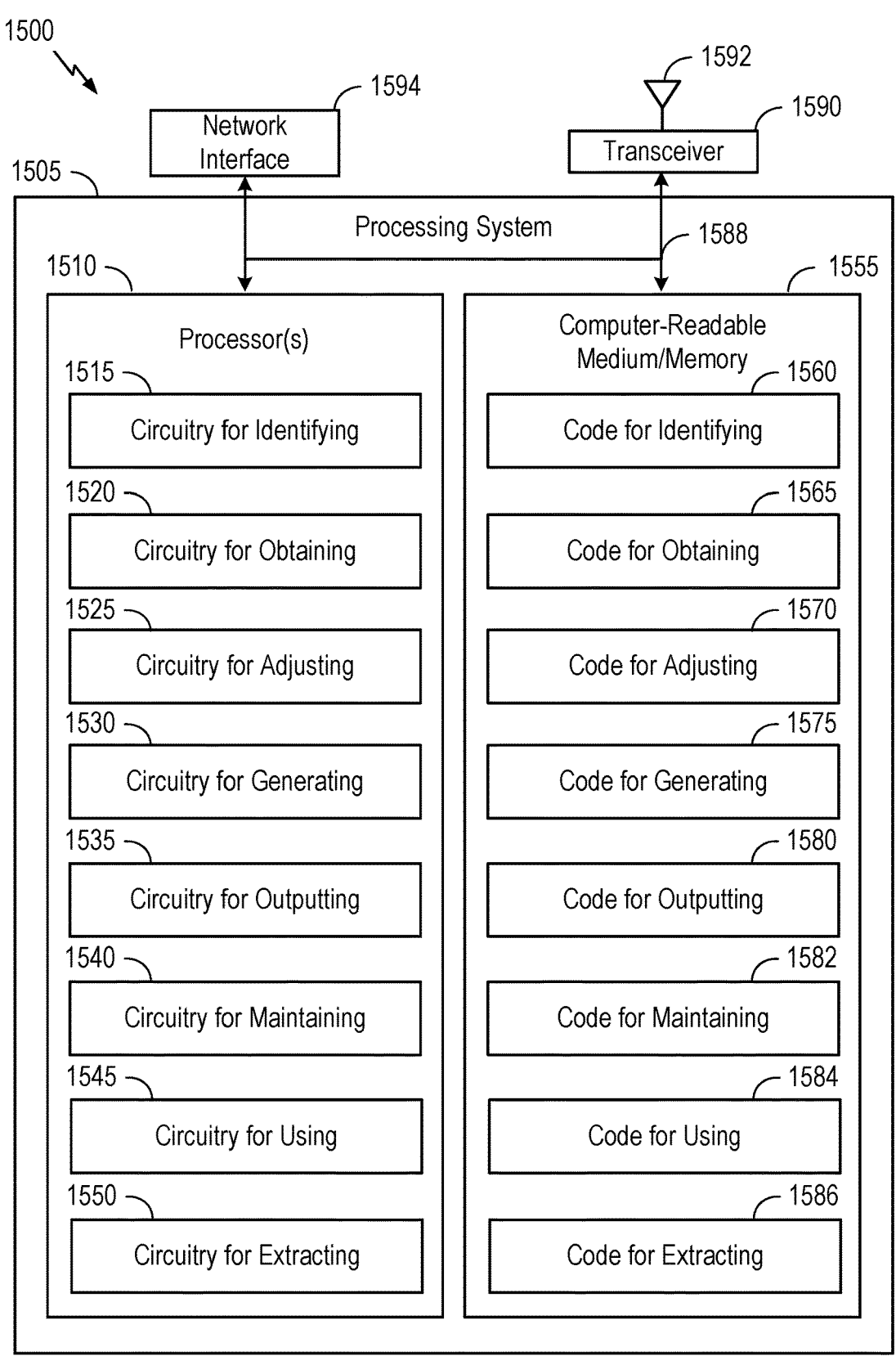
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Figure 14:
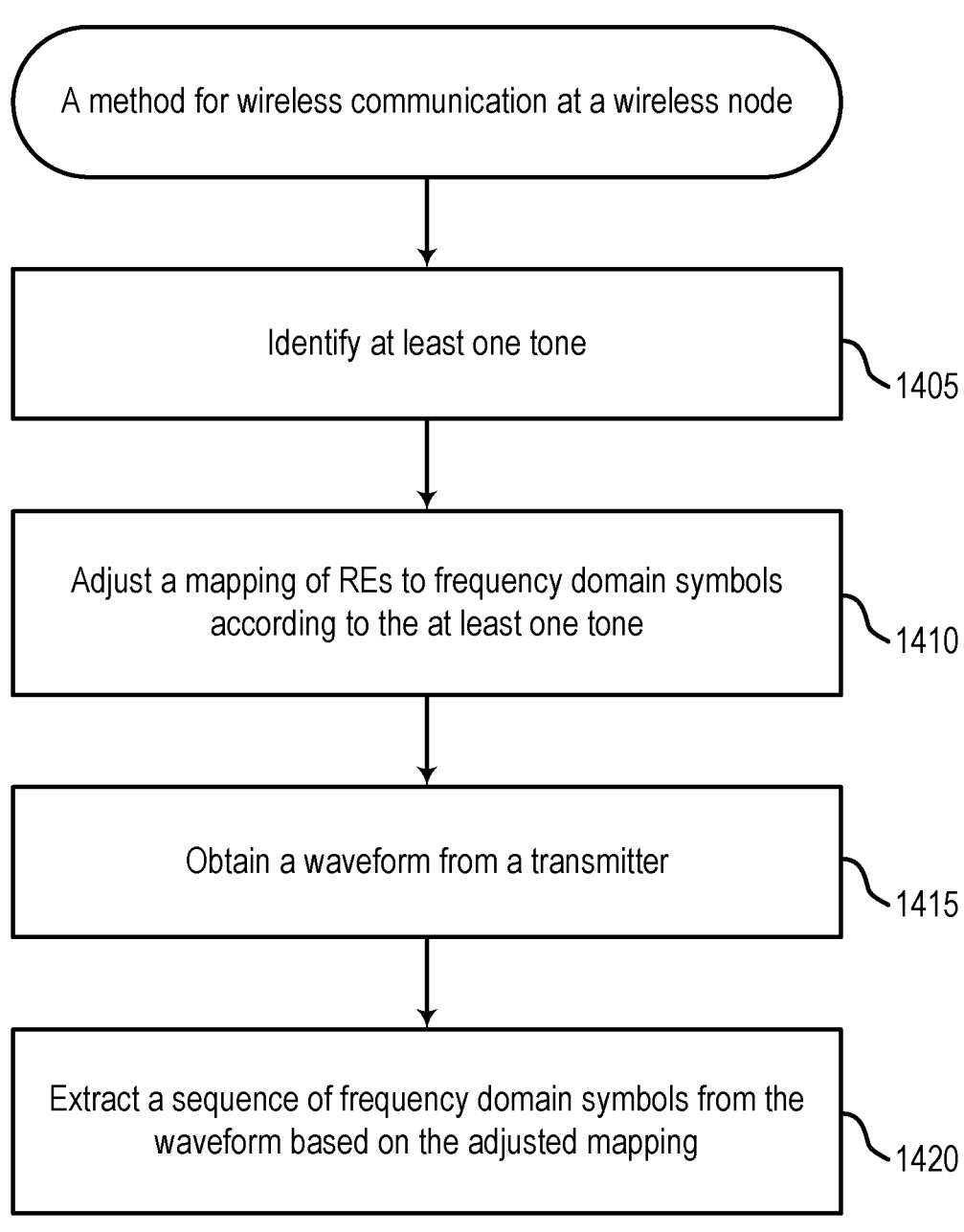
FIG. 14 depicts a method for wireless communications.

FIG. 14 shows an example of a method 1400 for wireless communication at a wireless node. In some examples, the wireless node is a UE, such as a UE 104 of FIGS. 1 and 3. In some examples, the wireless node is a network entity, such as BS 102 of FIGS. 1 and 3, or a disaggregated base station as discussed with respect to FIG. 2.

Method 1400 begins at step 1405 with identifying at least one tone. In some cases, the operations of this step refer to, or may be performed by, circuitry for identifying and/or code for identifying as described with reference to FIG. 15.

Method 1400 then proceeds to step 1410 with adjusting a mapping of REs to frequency domain symbols according to the at least one tone. In some cases, the operations of this step refer to, or may be performed by, circuitry for adjusting and/or code for adjusting as described with reference to FIG. 15.

Method 1400 then proceeds to step 1415 with obtaining a waveform from a transmitter. In some cases, the operations of this step refer to, or may be performed by, circuitry for obtaining and/or code for obtaining as described with reference to FIG. 15.

Method 1400 then proceeds to step 1420 with extracting a sequence of frequency domain symbols from the waveform based on the adjusted mapping. In some cases, the operations of this step refer to, or may be performed by, circuitry for extracting and/or code for extracting as described with reference to FIG. 15.

In some aspects, the adjusting comprises changing an order of the mapping to avoid mapping the identified at least one tone to a frequency domain symbol.

In some aspects, changing the order of the mapping comprises shifting at least some of the frequency domain symbols, in order, starting with a first frequency domain symbol that would have mapped the at least one tone would have mapped to before adjusting the mapping.

In some aspects, the at least one tone comprises at least a first tone and a second tone; and the frequency domain symbols are: shifted, in order, starting with a first frequency domain symbol to which the first tone would have mapped, and shifted again, in order, starting with a second frequency domain symbol to which the second tone would have mapped.

In some aspects, the REs are part of an allocated set of REs; and the adjustment comprises accounts for a first frequency domain symbol of the frequency domain symbols that would have mapped to the at least one tone that was appended to at least one end of the allocation at the transmitter.

In some aspects, the method 1400 further includes maintaining an order of mapping for one or more frequency domain symbols after the first frequency domain symbol when adjusting the mapping. In some cases, the operations of this step refer to, or may be performed by, circuitry for maintaining and/or code for maintaining as described with reference to FIG. 15.

In some aspects, the method 1400 further includes using the identified at least one tone as part of a tone reservation scheme. In some cases, the operations of this step refer to, or may be performed by, circuitry for using and/or code for using as described with reference to FIG. 15.

In some aspects, the method 1400 further includes outputting signaling indicating when the transmitter is to adjust mapping of frequency domain symbols to avoid the at least one tone. In some cases, the operations of this step refer to, or may be performed by, circuitry for outputting and/or code for outputting as described with reference to FIG. 15.

In some aspects, the method 1400 further includes obtaining signaling indicating a capability of the transmitter to adjust mapping of frequency domain symbols to avoid the at least one tone. In some cases, the operations of this step refer to, or may be performed by, circuitry for obtaining and/or code for obtaining as described with reference to FIG. 15.

In one aspect, method 1400, or any aspect related to it, may be performed by an apparatus, such as communications device 1500 of FIG. 15, which includes various components operable, configured, or adapted to perform the method 1400. Communications device 1500 is described below in further detail.

Note that FIG. 14 is just one example of a method, and other methods including fewer, additional, or alternative steps are possible consistent with this disclosure.

Example Communications Device

FIG. 15 depicts aspects of an example communications device 1500. In some aspects, communications device 1500 is a user equipment, such as UE 104 described above with respect to FIGS. 1 and 3. In some aspects, communications device 1500 is a network entity, such as BS 102 of FIGS. 1 and 3, or a disaggregated base station as discussed with respect to FIG. 2.

The communications device 1500 includes a processing system 1505 coupled to the transceiver 1590 (e.g., a transmitter and/or a receiver). In some aspects (e.g., when communications device 1500 is a network entity), processing system 1505 may be coupled to a network interface 1594 that is configured to obtain and send signals for the communications device 1500 via communication link(s), such as a backhaul link, midhaul link, and/or fronthaul link as described herein, such as with respect to FIG. 2. The transceiver 1590 is configured to transmit and receive signals for the communications device 1500 via the antenna 1592, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1555 via a bus 1588. In certain aspects, the computer-readable medium/memory 1555 is configured to store instructions (e.g., computer-executable code) that when executed by the one or more processors 1510, cause the one or more processors 1510 to perform the method 1300 described with respect to FIG. 13, or any aspect related to it, and/or the method 1400 described with respect to FIG. 14, or any aspect related to it. Note that reference to a processor performing a function of communications device 1500 may include one or more processors 1510 performing that function of communications device 1500.

In the depicted example, computer-readable medium/memory 1555 stores code (e.g., executable instructions), such as code for identifying 1560, code for obtaining 1565, code for adjusting 1570, code for generating 1575, code for outputting 1580, code for maintaining 1582, code for using 1584, and code for extracting 1586. Processing of the code for identifying 1560, code for obtaining 1565, code for adjusting 1570, code for generating 1575, code for outputting 1580, code for maintaining 1582, code for using 1584, and code for extracting 1586 may cause the communications device 1500 to perform the method 1300 described with respect to FIG. 13, or any aspect related to it, and/or the method 1400 described with respect to FIG. 14, or any aspect related to it.

The one or more processors 1510 include circuitry configured to implement (e.g., execute) the code stored in the computer-readable medium/memory 1555, including circuitry such as circuitry for identifying 1515, circuitry for obtaining 1520, circuitry for adjusting 1525, circuitry for generating 1530, circuitry for outputting 1535, circuitry for maintaining 1540, circuitry for using 1545, and circuitry for extracting 1550. Processing with circuitry for identifying 1515, circuitry for obtaining 1520, circuitry for adjusting 1525, circuitry for generating 1530, circuitry for outputting 1535, circuitry for maintaining 1540, circuitry for using 1545, and circuitry for extracting 1550 may cause the communications device 1500 to perform the method 1300 described with respect to FIG. 13, or any aspect related to it, and/or the method 1400 described with respect to FIG. 14, or any aspect related to it.

Various components of the communications device 1500 may provide means for performing the method 1300 described with respect to FIG. 13, or any aspect related to it, and/or the method 1400 described with respect to FIG. 14, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1590 and the antenna 1592 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1590 and the antenna 1592 of the communications device 1500 in FIG. 15. Means for identifying, means for adjusting, means for generating, means for maintaining, means for using, and/or means for extracting may include one or more of the processors illustrated in FIG. 3.

Example Clauses

Implementation examples are described in the following numbered clauses:

Clause 1: A method for wireless communication at a wireless node comprising: identifying at least one tone; obtaining a sequence of frequency domain symbols; adjusting a mapping of the frequency domain symbols to REs according to the at least one tone; generating a waveform based on the adjusted mapping; and outputting the waveform for transmission.

Clause 2: The method of Clause 1, wherein the adjustment comprises changing an order of the mapping to avoid the identified at least one tone.

Clause 3: The method of Clause 2, wherein changing the order of the mapping comprises shifting at least some of the frequency domain symbols, in order, starting with a first frequency domain symbol that would have mapped to the at least one tone before adjusting the mapping.

Clause 4: The method of Clause 3, wherein: the at least one tone comprises at least a first tone and a second tone; and the frequency domain symbols are: shifted, in order, starting with a first frequency domain symbol that would have mapped to the first tone, and shifted again, in order, starting with a second frequency domain symbol that would have mapped to the second tone.

Clause 5: The method of any one of Clauses 1-4, wherein: the REs are part of an allocated set of REs; and the adjustment comprises appending a first frequency domain symbol of the frequency domain symbols that would have mapped to the at least one tone to at least one end of the allocation.

Clause 6: The method of Clause 5, wherein the first frequency domain symbol is also mapped to the at least one tone.

Clause 7: The method of Clause 5, further comprising: maintaining an order of mapping for one or more frequency domain symbols after the first frequency domain symbol when adjusting the mapping.

Clause 8: The method of Clause 5, wherein: the at least one tone comprises at least a first tone and a second tone; and the adjustment comprises appending the first frequency domain symbol that would have mapped to the first tone and a second frequency domain symbol of the frequency domain symbols that would have mapped to the second tone to an end of the allocation.

Clause 9: The method of Clause 5, further comprising: obtaining signaling indicating a location of one of the REs for appending the first frequency domain symbol.

Clause 10: The method of any one of Clauses 1-9, wherein: generating the waveform comprises generating repetitions of the frequency domain symbols; and the mapping of the frequency domain symbols to the REs is adjusted before generating the repetitions.

Clause 11: The method of any one of Clauses 1-10, further comprising: using the identified at least one tone as part of a tone reservation scheme.

Clause 12: The method of any one of Clauses 1-11, further comprising: obtaining signaling indicating when to adjust the mapping to avoid the at least one tone.

Clause 13: The method of Clause 12, further comprising: outputting, for transmission, signaling indicating a capability of the wireless node to adjust the mapping to avoid the at least one tone.

Clause 14: A method for wireless communication at a wireless node comprising: identifying at least one tone; adjusting a mapping of REs to frequency domain symbols according to the at least one tone; obtaining a waveform from a transmitter; and extracting a sequence of frequency domain symbols from the waveform based on the adjusted mapping.

Clause 15: The method of Clause 14, wherein the adjusting comprises changing an order of the mapping to avoid mapping the identified at least one tone to a frequency domain symbol.

Clause 16: The method of Clause 15, wherein changing the order of the mapping comprises shifting at least some of the frequency domain symbols, in order, starting with a first frequency domain symbol that would have mapped the at least one tone would have mapped to before adjusting the mapping.

Clause 17: The method of Clause 16, wherein: the at least one tone comprises at least a first tone and a second tone; and the frequency domain symbols are: shifted, in order, starting with a first frequency domain symbol to which the first tone would have mapped, and shifted again, in order, starting with a second frequency domain symbol to which the second tone would have mapped.

Clause 18: The method of any one of Clauses 14-17, wherein: the REs are part of an allocated set of REs; and the adjustment comprises accounts for a first frequency domain symbol of the frequency domain symbols that would have mapped to the at least one tone that was appended to at least one end of the allocation at the transmitter.

Clause 19: The method of Clause 18, further comprising: maintaining an order of mapping for one or more frequency domain symbols after the first frequency domain symbol when adjusting the mapping.

Clause 20: The method of any one of Clauses 14-19, further comprising: using the identified at least one tone as part of a tone reservation scheme.

Clause 21: The method of any one of Clauses 14-20, further comprising: outputting signaling indicating when the transmitter is to adjust mapping of frequency domain symbols to avoid the at least one tone.

Clause 22: The method of Clause 21, further comprising: obtaining signaling indicating a capability of the transmitter to adjust mapping of frequency domain symbols to avoid the at least one tone.

Clause 23: An apparatus, comprising: a memory comprising executable instructions; and a processor configured to execute the executable instructions and cause the apparatus to perform a method in accordance with any one of Clauses 1-22.

Clause 24: An apparatus, comprising means for performing a method in accordance with any one of Clauses 1-22.

Clause 25: A non-transitory computer-readable medium comprising executable instructions that, when executed by a processor of an apparatus, cause the apparatus to perform a method in accordance with any one of Clauses 1-22.

Clause 26: A computer program product embodied on a computer-readable storage medium comprising code for performing a method in accordance with any one of Clauses 1-22.

Clause 27: A wireless node, comprising: at least one transceiver; a memory comprising instructions; and one or more processors configured to execute the instructions and cause the wireless node to perform a method in accordance with any one of Clauses 1-22, wherein the at least one transceiver is configured to transmit the waveform.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus, comprising:
   at least one transceiver;
   at least one memory comprising processor-executable instructions; and
   one or more processors configured to execute the processor-executable instructions to cause the apparatus to:
      identify at least one tone, wherein the at least one tone is associated with one or more spurs, each spur comprising a narrowband signal representing frequency-selective noise associated with the at least one tone;
      receive, via the at least one transceiver, a sequence of frequency domain symbols;
      adjust a mapping of the frequency domain symbols to resource elements (REs) to avoid the identified at least one tone associated with the one or more spurs;
      generate a waveform based on the adjusted mapping; and
      transmit, via the at least one transceiver, the waveform.

2. The apparatus of claim 1, wherein, to adjust the mapping, the one or more processors are configured to cause the apparatus to change an order of the mapping to avoid the identified at least one tone.

3. The apparatus of claim 2, wherein, to change the order of the mapping, the one or more processors are configured to cause the apparatus to shift at least some of the frequency domain symbols, in order, starting with a first frequency domain symbol that would have mapped to the at least one tone before adjusting the mapping.

4. The apparatus of claim 3, wherein:
   the at least one tone comprises at least a first tone and a second tone; and
   the frequency domain symbols are:
      shifted, in order, starting with a first frequency domain symbol that would have mapped to the first tone, and
      shifted again, in order, starting with a second frequency domain symbol that would have mapped to the second tone.

5. The apparatus of claim 1, wherein:
   the REs are part of an allocated set of REs; and
   to adjust the mapping, the one or more processors are configured to cause the apparatus to append a first frequency domain symbol of the frequency domain symbols that would have mapped to the at least one tone to at least one end of the allocated set of REs.

6. The apparatus of claim 5, wherein the first frequency domain symbol is also mapped to the at least one tone.

7. The apparatus of claim 5, wherein the one or more processors are further configured to cause the apparatus to maintain an order of mapping for one or more frequency domain symbols after the first frequency domain symbol when adjusting the mapping.

8. The apparatus of claim 5, wherein:

the at least one tone comprises at least a first tone and a second tone; and to adjust the mapping, the one or more processors are configured to cause the apparatus to append the first frequency domain symbol that would have mapped to the first tone and a second frequency domain symbol of the frequency domain symbols that would have mapped to the second tone to at least one end of the allocated set of REs.

9. The apparatus of claim 5, wherein the one or more processors are further configured to cause the apparatus to receive, via the at least one transceiver, signaling indicating a location to append the first frequency domain signal to one RE of the allocated set of REs.

10. The apparatus of claim 1, wherein the one or more processors are further configured to cause the apparatus to generate repetitions of the frequency domain symbols, wherein:

the mapping of the frequency domain symbols to the REs is adjusted before generating the repetitions; and to generate the waveform based on the adjusted mapping, the one or more processors are configured to cause the apparatus to map frequency domain symbols of the repetitions to the REs using the adjusted mapping.

11. The apparatus of claim 1, wherein the one or more processors are further configured to cause the apparatus to use the identified at least one tone as part of a tone reservation scheme.

12. The apparatus of claim 1, wherein the one or more processors are further configured to cause the apparatus to receive, via the at least one transceiver, signaling indicating when to adjust the mapping to avoid the at least one tone.

13. The apparatus of claim 1, wherein the one or more processors are further configured to cause the apparatus to receive, via the at least one transceiver, signaling indicating a capability of the apparatus to adjust the mapping to avoid the at least one tone.

14. An apparatus configured for wireless communication, comprising:

at least one transceiver;

at least one memory comprising processor-executable instructions; and one or more processors configured to execute the processor-executable instructions to cause the apparatus to:

identify at least one tone, wherein the at least one tone is associated with one or more spurs, each spur comprising a narrowband signal representing frequency-selective noise associated with the at least one tone;

adjust a mapping of resource elements (REs) to frequency domain symbols to avoid the identified at least one tone associated with the one or more spurs;

receive, via the at least one transceiver, a waveform from a wireless node; and extract a sequence of frequency domain symbols from the waveform based on the adjusted mapping.

15. The apparatus of claim 14, wherein, to adjust the mapping, the one or ore processors are configured to cause the apparatus to change an order of the mapping to avoid mapping the identified at least one tone to a frequency domain symbol.

16. The apparatus of claim 15, wherein, to change the order of the mapping, the one or more processors are configured to cause the apparatus to shift at least some of the frequency domain symbols, in order, starting with a first frequency domain symbol that would have mapped the at least one tone would have mapped to before adjusting the mapping.

17. The apparatus of claim 16, wherein:

the at least one tone comprises at least a first tone and a second tone; and the frequency domain symbols are:

shifted, in order, starting with a first frequency domain symbol to which the first tone would have mapped, and shifted again, in order, starting with a second frequency domain symbol to which the second tone would have mapped.

18. The apparatus of claim 14, wherein:

the REs are part of an allocated set of REs; and the adjustment accounts for a first frequency domain symbol of the frequency domain symbols that would have mapped to the at least one tone that was appended to at least one end of the allocated set of REs.

19. The apparatus of claim 18, wherein the one or more processors are further configured to cause the apparatus to maintain an order of mapping for one or more frequency domain symbols after the first frequency domain symbol when adjusting the mapping.

20. The apparatus of claim 14, wherein the one or more processors are further configured to cause the apparatus to use the identified at least one tone as part of a tone reservation scheme.

21. The apparatus of claim 14, wherein the one or more processors are further configured to cause the apparatus to:

transmit, via the at least one transceiver, signaling indicating when the wireless node is to adjust mapping of frequency domain symbols to avoid the at least one tone; and transmit, via the at least one transceiver, signaling indicating a capability of the wireless node to adjust mapping of frequency domain symbols to avoid the at least one tone.

22. The apparatus of claim 1, wherein the apparatus is configured to operate as wireless node.

23. The apparatus of claim 14, wherein the apparatus is configured to operate as wireless node.

* * * * *